US009414393B2

(12) United States Patent
Liu et al.

(10) Patent No.: US 9,414,393 B2
(45) Date of Patent: Aug. 9, 2016

(54) RESOURCE ALLOCATION METHOD FOR ALLOCATING RESOURCE BLOCKS TO SEVERAL USER EQUIPMENT

(71) Applicant: Industrial Technology Research Institute, Hsinchu (TW)

(72) Inventors: Chia-Lung Liu, Hsinchu County (TW); Hsi-Lu Chao, Taipei (TW); Lung-Han Hsu, Tainan (TW); Chia-Kai Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 181 days.

(21) Appl. No.: 14/221,255

(22) Filed: Mar. 20, 2014

(65) Prior Publication Data

US 2015/0195736 A1 Jul. 9, 2015

(30) Foreign Application Priority Data

Jan. 3, 2014 (TW) .............................. 103100220 A

(51) Int. Cl.
*H04W 72/04* (2009.01)
*H04W 28/02* (2009.01)
*H04L 12/811* (2013.01)

(52) U.S. Cl.
CPC ........... *H04W 72/0493* (2013.01); *H04L 47/38* (2013.01); *H04W 28/0231* (2013.01)

(58) Field of Classification Search
None
See application file for complete search history.

(56) References Cited

U.S. PATENT DOCUMENTS

| 7,724,773 | B2 | 5/2010 | Zhang et al. |
| 7,929,472 | B2 | 4/2011 | Gu et al. |
| 8,195,180 | B2 | 6/2012 | Higuchi |
| 2003/0236854 | A1* | 12/2003 | Rom ................... H04L 12/5695 709/217 |
| 2007/0297386 | A1 | 12/2007 | Zhang et al. |
| 2009/0154419 | A1 | 6/2009 | Yoshida et al. |

(Continued)

FOREIGN PATENT DOCUMENTS

| CN | 102119552 | 7/2011 |
| CN | 102804831 | 11/2012 |
| TW | 201106670 | 2/2011 |

OTHER PUBLICATIONS

"Office Action of Taiwan Counterpart Application," issued on May 19, 2015, p. 1-p. 3.

(Continued)

*Primary Examiner* — Noel Beharry
*Assistant Examiner* — Rodrick Mak
(74) *Attorney, Agent, or Firm* — Jianq Chyun IP Office

(57) ABSTRACT

A base station and a resource allocation method are provided. The method includes: calculating transmission rates of user equipment (UE) on unallocated resource blocks; finding consecutive resource block (RB) sets within the unallocated resource blocks according to a predetermined window size; finding minimum transmission rates of the UE among the transmission rates respectively corresponding to the consecutive RB sets; finding a largest value and a second largest value corresponding to each of the consecutive RB sets among the minimum transmission rates corresponding to the UE; calculating absolute difference values between the largest value and the second largest value corresponding to each of the consecutive RB sets; finding a maximum absolute difference value from the absolute difference values corresponding to the consecutive RB sets; and allocating the consecutive RB set corresponding to the maximum absolute difference value to the specific UE.

12 Claims, 6 Drawing Sheets

(56) References Cited

U.S. PATENT DOCUMENTS

| | | | |
|---|---|---|---|
| 2011/0188388 A1 | 8/2011 | Ko et al. | |
| 2013/0072246 A1* | 3/2013 | Nobukiyo | H04W 72/08 455/512 |
| 2013/0176949 A1* | 7/2013 | Sun | H04W 72/1221 370/329 |
| 2015/0057011 A1* | 2/2015 | Di Girolamo | H04W 16/14 455/454 |

OTHER PUBLICATIONS

Ekstrom et al., "Technical Solutions for the 3G Long-Term Evolution," IEEE Communications Magazine, Mar. 2006, pp. 38-45.

Lunttila et al., "EUTRAN Uplink Performance," International Symposium on Wireless Pervasive Computing (ISWPC) 2007, Feb. 5-7, 2007, pp. 515-519.

Moray Rumney, "3GPP LTE: Introducing Single-Carrier FDMA," Agilent Measurement Journal, Jan. 1, 2008, pp. 1-10.

Sesia et al., "LTE—the UMTS Long Term Evolution From Theory to Practice 2nd ed.," John Wiley & Sons, Ltd. Publication, Jul. 2011, pp. 1-794.

Calabrese et al., "Search-Tree Based Uplink Channel Aware Packet Scheduling for UTRAN LTE," 2008 Spring Vehicular Technology Conference, May 11-14, 2008, pp. 1949-1953.

Ruiz De Temino et al., "Channel-Aware Scheduling Algorithms for SC-FDMA in LTE Uplink," 2008 IEEE 19th International Symposium on Personal, Indoor and Mobile Radio Communications(PIMRC), Sep. 15-18, 2008, pp. 1-6.

Al-Rawi et al., "On the Performance of Heuristic Opportunistic Scheduling in the Uplink of 3G LTE Networks," 2008 IEEE 19th International Symposium on Personal, Indoor and Mobile Radio Communications(PIMRC), Sep. 15-18, 2008, pp. 1-6.

Yaacoub et al., "A Game Theoretical Formulation for Proportional Fairness in LTE Uplink Scheduling," 2009 IEEE Wireless Communications and Networking Conference(WCNC), Apr. 5-8, 2009, pp. 1-5.

Wong et al., "Optimal Resource Allocation in Uplink SC-FDMA Systems," IEEE Transactions on Wireless Communications, May 2009, pp. 2161-2165.

Liu et al., "Improved Recursive Maximum Expansion Scheduling Algorithms for Uplink Single Carrier FDMA System," 2010 IEEE 71st Vehicular Technology Conference (VTC 2010-Spring), May 16-19, 2010, pp. 1-5.

Wang et al., "Resource Allocation for SC-FDMA in LTE Uplink," 2011 IEEE International Conference on Service Operations, Logistics, and Informatics (SOLI), Jul. 10-12, 2011, pp. 601-604.

Chang et al., "Sum Throughput-Improved Resource Allocation for LTE Uplink Transmission," 2011 IEEE Vehicular Technology Conference (VTC Fall), Sep. 5-8, 2011, pp. 1-5.

Nwamadi et al., "Multi-criteria ranking based greedy algorithm for physical resource block allocation in multi-carrier wireless communication systems," Signal Processing, May 2012, pp. 2706-2717.

Wu et al., "User Satisfaction-Based Scheduling Algorithm for Uplink Transmission in Long Term Evolution System," 2012 IEEE 18th International Conference on Parallel and Distributed Systems, Dec. 17-19, 2012, pp. 930-935.

Kim et al., "An Efficient Scheduler for Uplink Single Carrier FDMA System," 2010 IEEE 21st International Symposium on Personal Indoor and Mobile Radio Communications, Sep. 26-30, 2010, pp. 1348-1353.

* cited by examiner

| transmission rate \ resource block \ user equipment | RB1 | RB2 | RB3 | RB4 | RB5 |
|---|---|---|---|---|---|
| UE1 | 1 | 8 | 2 | 5 | 5 |
| UE2 | 6 | 5 | 4 | 1 | 9 |

FIG. 3A

| minimum transmission rate \ consecutive resource block set \ user equipment | RB123 | RB234 | RB345 |
|---|---|---|---|
| UE1 | 1 | 2 | 2 |
| UE2 | 4 | 1 | 1 |

FIG. 3B

| absolute difference value / consecutive resource block set / user equipment combination | RB123 | RB234 | RB345 |
|---|---|---|---|
| UE12 | 3 | 1 | 1 |

FIG. 3C

| transmission rate \ resource block | RB4 | RB5 |
|---|---|---|
| user equipment | | |
| UE1 | 5 | 5 |
| UE2 | 1 | 9 |

FIG. 4A

| minimum transmission rate \ consecutive resource block set | RB45 |
|---|---|
| user equipment | |
| UE1 | 5 |
| UE2 | 1 |

FIG. 4B

| user equipment combination | absolute difference value / consecutive resource block set | RB45 |
|---|---|---|
| UE12 | | 4 |

FIG. 4C

RESOURCE ALLOCATION METHOD FOR ALLOCATING RESOURCE BLOCKS TO SEVERAL USER EQUIPMENT

CROSS-REFERENCE TO RELATED APPLICATION

This application claims the priority benefit of Taiwan application serial no. 103100220, filed on Jan. 3, 2014. The entirety of the above-mentioned patent application is hereby incorporated by reference herein and made a part of this specification.

TECHNICAL FIELD

This disclosure relates to a base station and a resource allocation method thereof.

BACKGROUND

Long term evolution (LTE) technology is a communication system standard made by the 3rd generation partnership project (3GPP), and the complete specification has been completed and finalized after years of development. Because of the advantages of less transmission delay, higher data transmission rate, improved system throughput, and flexible and efficient use of spectrum, etc., it is highly expected that LTE technology will be able to meet the users' demands for high rate and high immediacy in the next decade. To achieve these goals, orthogonal frequency division multiple access (OFDMA) is selected as the technology for downlink transmission of the base station of LTE. However, OFDMA transmission consumes more energy and therefore is not suitable for user equipment (UE) with limited power. In other words, the OFDMA technology is not suitable for uplink transmission.

Therefore, in the LTE standard, single carrier frequency division multiple access (SC-FDMA) is used for uplink transmission. The difference between SC-FDMA and OFDMA is that: for SC-FDMA, discrete Fourier transform (DFT) is performed before inverse fast Fourier transform (IFFT), and after performing DFT, data symbol will be spread over all subcarriers to generate a virtual single-frequency structure. This structure is also called DFT-spread OFDM. Through this structure, SC-FDMA can have a peak to average power ration (PAPR) lower than OFDMA. Thus, the efficiency of power utilization would be improved when the user equipment performs uplink transmission, thereby extending battery life.

In the LTE system, the spectrum that can be used by LTE is divided into multiple resource blocks (RB), and one resource block is the smallest unit of resource allocation of LTE. Each resource block occupies a frequency band of 180 kHz in terms of the frequency domain. This frequency band includes 12 consecutive subcarriers, and each resource block includes a transmission time interval (TTI) in the unit of one millisecond in terms of the time domain. In this disclosure, the data bits that one resource block can carry is called "resource block capacity."

In the downlink implemented by OFDMA, the base station usually allocates resource blocks to the user equipment having the best channel quality, so as to achieve multi-user diversity and maximize the overall transmission rate. Therefore, the channel-dependent scheduling (CDS) algorithm is very suitable for the downlink.

In the uplink of LTE, however, due to the limitations of the SC-FDMA technology, allocation of the resource blocks to the user equipment must comply with the limitation of consecutiveness. Specifically, the resource blocks allocated to one user equipment have to be consecutive in the frequency band. This limitation of SC-FDMA significantly reduces the flexibility in resource allocation when the base station allocates the resource blocks to the user equipment. Here, this limitation is called "consecutive resource block allocation." In addition, another limitation that affects the uplink transmission rate during resource allocation is that one user equipment must adopt the same modulation and coding scheme (MCS) in the resource block being allocated. Therefore, for the user equipment, the resource block capacity that can be achieved on each resource block being allocated has to be the smallest capacity in the resource blocks being allocated. Here, this limitation is called "Fixed MCS format."

In the current research on LTE uplink resource allocation (e.g. recursive maximum expansion (RME) algorithm), usually "consecutive resource block allocation" is the only limitation that is taken into account, and the important limitation "fixed MCS format" is ignored. As a result, the overall transmission rate of the system becomes very unsatisfactory when "fixed MCS format" is taken into consideration.

According to the relevant literature, methods of LTE uplink resource allocation are generally categorized into two types. The first type is to allocate the resource blocks to the user equipment with better SNR (Signal to Noise Ratio). The second type is to allocate the resource blocks to the user equipment that can temporarily elevate the overall transmission rate of the system to the highest level. These methods both achieve favorable overall transmission rates in the first few resource block allocations. However, the influence of the current allocation to the subsequent allocations is not taken into account, and as a result, the final overall transmission rate is not ideal as expected. For example, the conventional base station is configured to allocate resource blocks to the next user equipment only after completing allocation of resource blocks to the current user equipment. For this reason, even though favorable transmission rates may be achieved in the first few user equipment, the transmission rates for the later user equipment may decrease significantly, which affects the overall LTE uplink transmission rate.

SUMMARY

One of the exemplary embodiments discloses a resource allocation method, suitable for a base station allocating a plurality of resource blocks to a plurality of user equipment. The resource allocation method includes: calculating a plurality of transmission rates of the plurality of user equipment on the resource blocks that are not allocated; finding a plurality of consecutive resource block sets among the resource blocks being unallocated according to a predetermined window size; finding a minimum transmission rate of each user equipment among the transmission rates respectively corresponding to the consecutive resource block sets; finding a largest value and a second largest value corresponding to each of the consecutive resource block sets among the minimum transmission rate corresponding to each user equipment; calculating an absolute difference value between the largest value and the second largest value corresponding to each of the consecutive resource block sets, and finding a maximum absolute difference value from the absolute difference value corresponding to each of the consecutive resource block sets; and allocating the consecutive resource block set corresponding to the maximum absolute difference value to one specific user equipment. The specific user equipment is the user equipment corresponding to the largest value of the consecutive resource block set being allocated, and the specific user equipment performs transmission at the corresponding minimum transmission rate in the consecutive resource block set being allocated.

This disclosure provides a base station that includes a storage unit and a processing unit. The storage unit stores a plurality of codes. The processing unit is coupled to the storage unit and accesses and executes the codes to perform the following steps: calculating a plurality of transmission rates of a plurality of user equipment on a plurality of resource blocks that are not allocated; finding a plurality of consecutive resource block sets among the resource blocks being unallocated according to a predetermined window size; finding a minimum transmission rate of each user equipment among the transmission rates respectively corresponding to the consecutive resource block sets; finding a largest value and a second largest value corresponding to each of the consecutive resource block sets among the minimum transmission rate corresponding to each user equipment; calculating an absolute difference value between the largest value and the second largest value corresponding to each of the consecutive resource block sets; finding a maximum absolute difference value from the absolute difference value corresponding to each of the consecutive resource block sets; and allocating the consecutive resource block set corresponding to the maximum absolute difference value to one specific user equipment. The specific user equipment is the user equipment corresponding to the largest value of the consecutive resource block set being allocated, and the specific user equipment performs transmission at the corresponding minimum transmission rate in the consecutive resource block set being allocated.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3A is a table showing transmission rates of user equipment on respective resource blocks according to an embodiment of the disclosure.

FIG. 3B is a table showing minimum transmission rates of the user equipment on consecutive resource block sets according to the embodiment of FIG. 3A.

FIG. 3C is a table showing a relationship between absolute difference values, consecutive resource block sets, and user equipment combination according to the embodiment of FIG. 3B.

FIG. 4A is a table showing transmission rates of user equipment on resource blocks being unallocated according to the embodiment of FIG. 3A.

FIG. 4B is a table showing minimum transmission rates of the user equipment on consecutive resource block sets according to the embodiment of FIG. 4A.

FIG. 4C is a table showing a relationship between absolute difference values, consecutive resource block sets, and user equipment combination according to the embodiment of FIG. 4B.

DETAILED DESCRIPTION OF DISCLOSED EMBODIMENTS

This disclosure provides a base station and a resource allocation method for effectively improving an uplink transmission rate of the overall communication system with consideration of limitations of "consecutive resource block allocation" and "fixed MCS format."

In at least one embodiment among several embodiments, the base station and the resource allocation method thereof are configured to simultaneously consider various situations of allocating consecutive resource block sets, selected according to a predetermined window size, to different user equipment before actually allocating resource blocks to the user equipment, so as to find a combination that achieves the maximum transmission rate from the possible allocations. Different figures below are used to illustrate some exemplary embodiments of the base station and/or the resource allocation method thereof provided by this disclosure. However, it should be noted that this disclosure is not limited thereto.

Figure 1:
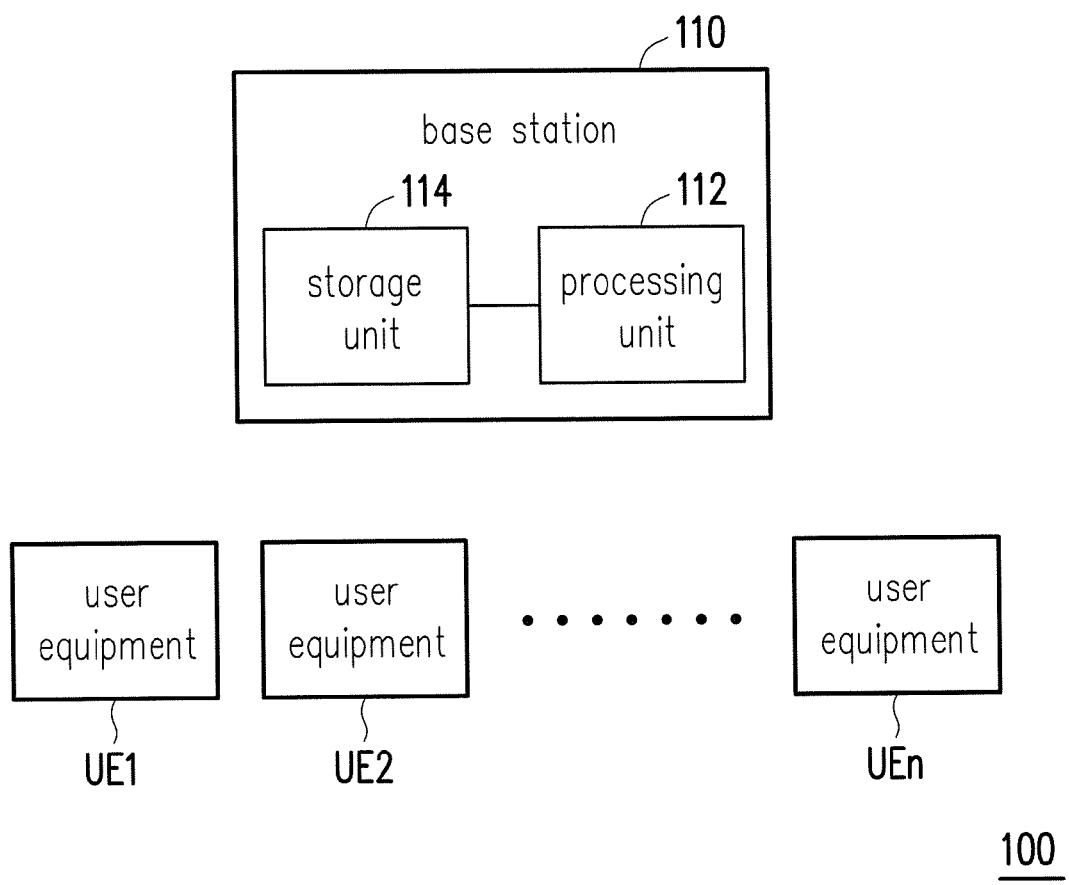
FIG. 1 is a schematic diagram illustrating a communication system according to an embodiment of the disclosure.

FIG. 1 is a schematic diagram illustrating a communication system according to an embodiment of the disclosure. In this embodiment, the communication system 100 includes a base station 110 and user equipment UE1~UEn (n is a positive integer). The base station 110 is a node B (referred to as "Node B") or an advanced node B (referred to as "eNode B") in an LTE system, for example.

The user equipment UE1~UEn may respectively include a transceiver (not shown), a communication protocol module (not shown), and a memory (not shown). The transceiver and the memory may both be connected to the communication protocol module. The transceiver may be configured for transmitting and receiving signals from other devices within a coverage area thereof. The transceiver is capable of performing analog to digital signal conversion (ADC), digital to analog signal conversion (DAC), modulation, demodulation, signal amplification, low-pass filtering, and bandpass filtering. For example, the transceiver is configured to provide information on a received signal to the communication protocol module, modulating data received from the communication protocol module into a modulated signal, and transmitting the modulated signal to other devices in the communication system 100.

The communication protocol module is configured to receive a request message from the other devices in the communication system 100, and processing a command in the message (or performing a corresponding operation according to a parameter in the message). The communication protocol module may include a processor and an embedded software or firmware program. The embedded software or firmware program may include a code of a communication protocol stack. In addition, the memory is configured to temporarily store various parameters or other data. The user equipment UE1~UEn individually further includes other elements, such as an antenna module for implementing the aforementioned functions of the transceiver, the communication protocol module, and the memory. According to a wireless network embodiment of the communication system 100, such as CDMA, WCDMA, GSM, UMTS, 3G, 4G, WiMAX, LTE, or other suitable embodiments, other elements may be included in the user equipment UE1~UEn and the base station 110.

It should be understood that the user equipment UE1~UEn illustrated in FIG. 1 may be a mobile station (MS), an advanced mobile station (AMS), or a wireless terminal communication device). In addition, the user equipment UE1~UEn may also be digital televisions (TV), digital settop boxes, personal computers (PC), laptop computers, tablet computers, netbooks, mobile phones, and smart mobile phones.

The base station 110 includes a processing unit 112 and a storage unit 114. The storage unit 114 stores a plurality of codes. The storage unit 114 is, for example, a memory, a hard drive, or any element used for storing the codes. The processing unit 112 is coupled to the storage unit 114. The processing unit 112 is capable of accessing and executing the codes recorded in the storage unit 114. The processing unit 112 may be a general purpose processor, a special purpose processor, a conventional processor, a digital signal processor, a plurality of microprocessors, a microprocessor combining one or more digital signal processor cores, a controller, a microcontroller, a application specific integrated circuit (ASIC), a field programmable gate array circuit (FPGA), any other kind of integrated circuit, a state machine, a processor based on an advanced RISC machine (ARM), or the like. The user equipment UE1~UEn may respectively be smart phones, laptop computers, netbook notebook computers, PCs or tablet computers, or other similar electronic devices. In addition, the base station 110 may also include the transceiver (not shown), the communication protocol module (not shown), and the memory (not shown) as described above, and these elements have functions the same as or similar to those of the elements included in the user equipment UE1~UEn, which are not repeated hereinafter.

In a downlink of the communication system 100, the base station 110 may use, for example, OFDMA transmission technology to send data to the user equipment UE1~UEn, and in an uplink of the communication system 100, the user equipment UE1~UEn respectively utilizes SC-FDMA transmission technology to transmit data to the base station 110. However, it should be noted that the embodiments of this disclosure are not limited thereto.

Figure 2:
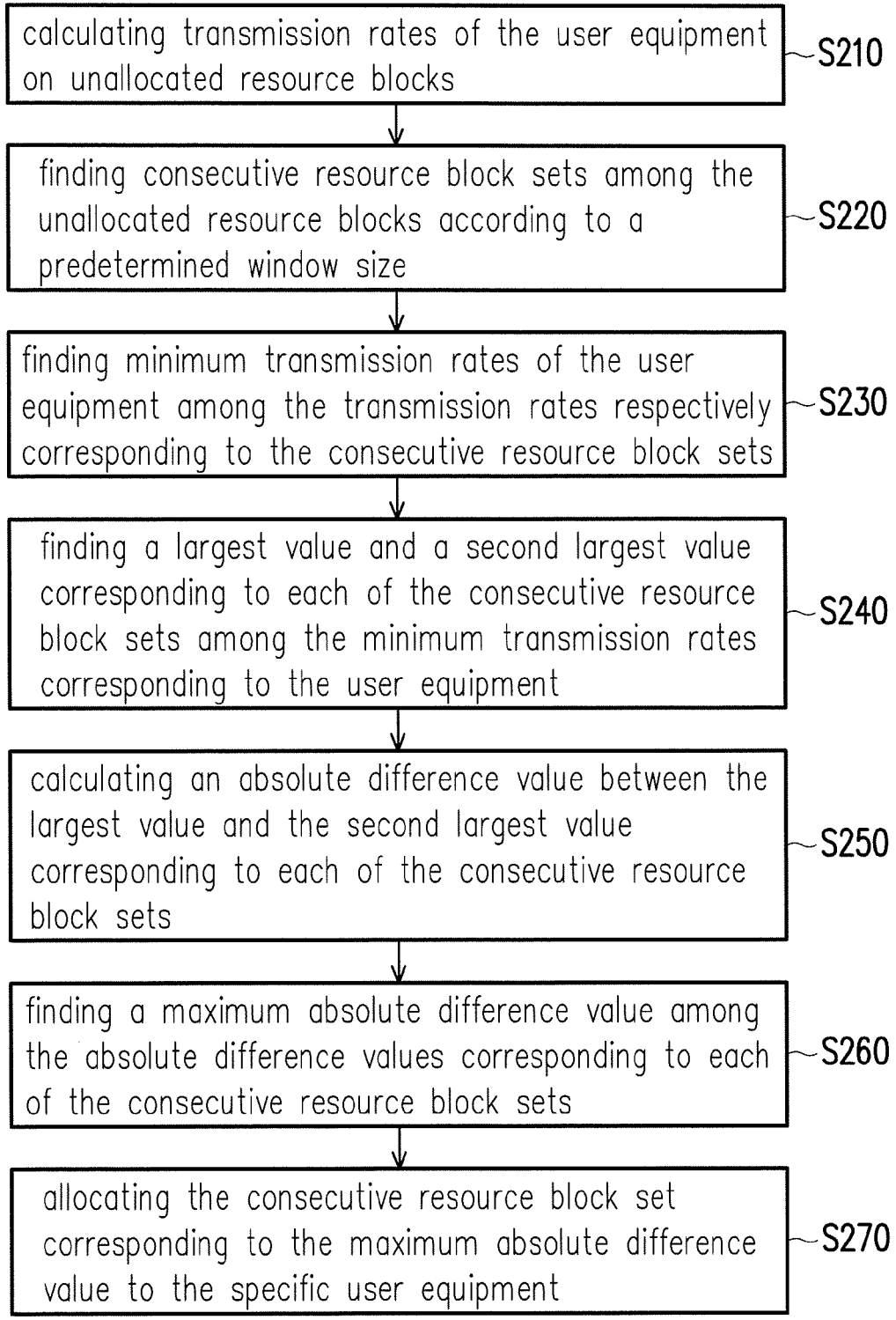
FIG. 2 is a flow chart illustrating a resource allocation method according to an embodiment of the disclosure.

FIG. 2 is a flow chart illustrating a resource allocation method according to an embodiment of the disclosure. The method disclosed in this embodiment may be executed by the processing unit 112 of the base station 100 in FIG. 1. Steps of the method of this embodiment are described with reference to the devices shown in FIG. 1 in the following discussions.

In Step S210, the processing unit 112 calculates transmission rates of the user equipment UE1~UEn on resource blocks being unallocated. Specifically, the processing unit 112 obtains a MCS that the user equipment UE1~UEn should adopt on each of the resource blocks according to a corresponding SNR or SINR value of the user equipment UE1~UEn on each of the resource blocks being unallocated. Then, the processing unit 112 may obtain transmission rates that the user equipment UE1~UEn can achieve on each of the resource blocks based on the MCS adopted by the user equipment UE1~UEn on each of the resource blocks.

For convenience of description, while referring to FIG. 1 and FIG. 2, details of this disclosure are described below also based on the data in FIG. 3A to FIG. 3C. FIG. 3A is a table showing transmission rates of the user equipment on the respective resource blocks according to an embodiment of the disclosure. FIG. 3A illustrates the transmission rates of the user equipment UE1 and UE2 on the resource blocks RB1~RB5 in a situation that n is 2 and the resource blocks that can be allocated to the user equipment UE1 and UE2 are the resource blocks RB1~RB5, wherein the resource blocks RB1~RB5 are, for example, resource blocks being unallocated. Take the user equipment UE1 as an example, the transmission rates thereof on the resource blocks RB1~RB5 are 1, 8, 2, 5, and 5 bits/RB. Then, take the user equipment UE2 as an example, the transmission rates thereof on the resource blocks RB1~RB5 are 6, 5, 4, 1, and 9 bits/RB.

Next, in step S220, the processing unit 112 may find a plurality of consecutive resource block sets among the resource blocks being unallocated according to a predetermined window size. The consecutive resource block sets may respectively include a plurality of consecutive resource blocks in the resource blocks. Taking FIG. 3A as an example, assuming that the predetermined window size is three resource blocks, the processing unit 112 may select the consecutive resource block sets RB123, RB234, and RB345 respectively from the resource blocks RB1~RB5. The consecutive resource block set RB123 includes consecutive resource blocks RB1~RB3. The consecutive resource block set RB234 includes consecutive resource blocks RB2~RB4. The consecutive resource block set RB345 includes consecutive resource blocks RB3~RB5. From another aspect, a union of the consecutive resource block sets RB123, RB234, and RB345 found by the processing unit 112 is the resource blocks RB1~RB5.

In step S230, the processing unit 112 finds minimum transmission rates of the user equipment among the transmission rates respectively corresponding to the consecutive resource block sets. In this embodiment, the minimum transmission rates found by the processing unit 112 in step S230 are organized as the table shown in FIG. 3B. FIG. 3B is the table showing the minimum transmission rates of the user equipment on the consecutive resource block sets according to the embodiment of FIG. 3A. Take the user equipment UE1 as an example, the processing unit 112 may respectively find the minimum transmission rates of the user equipment UE1 on the consecutive resource block sets RB123, RB234, and RB345. Specifically, the processing unit 112 obtains a minimum value (i.e. 1) of the transmission rates (i.e. 1, 8, and 2) of the user equipment UE1 on the consecutive resource block set RB123 to serve as the minimum transmission rate of the user equipment UE1 on the consecutive resource block set RB123. In addition, the processing unit 112 obtains a minimum value (i.e. 2) of the transmission rates (i.e. 8, 2, and 5) of the user equipment UE1 on the consecutive resource block set RB234 to serve as the minimum transmission rate of the user equipment UE1 on the consecutive resource block set RB234. Further, the processing unit 112 obtains a minimum value (i.e. 2) of the transmission rates (i.e. 2, 5, and 5) of the user equipment UE1 on the consecutive resource block set RB345 to serve as the minimum transmission rate of the user equipment UE1 on the consecutive resource block set RB345.

Taking the user equipment UE2 as another example, the processing unit 112 may respectively find the minimum transmission rates of the user equipment UE2 on the consecutive resource block sets RB123, RB234, and RB345. Specifically, the processing unit 112 obtains a minimum value (i.e. 4) of the transmission rates (i.e. 6, 5, and 4) of the user equipment UE2 on the consecutive resource block set RB123 to serve as the minimum transmission rate of the user equipment UE2 on the consecutive resource block set RB123. In addition, the processing unit 112 obtains a minimum value (i.e. 1) of the transmission rates (i.e. 5, 4, and 1) of the user equipment UE2 on the consecutive resource block set RB234 to serve as the minimum transmission rate of the user equipment UE2 on the consecutive resource block set RB234. Further, the processing unit 112 obtains a minimum value (i.e. 1) of the transmission rates (i.e. 4, 1, and 9) of the user equipment UE2 on the consecutive resource block set RB345 to serve as the minimum transmission rate of the user equipment UE2 on the consecutive resource block set RB345.

In step S240, the processing unit 112 may find a largest value and a second largest value corresponding to each of the consecutive resource block sets among the minimum transmission rates corresponding to the user equipment. Thereafter, in step S250, the processing unit 112 may calculate an absolute difference value between the largest value and the second largest value corresponding to each of the consecutive resource block sets. In the embodiment of FIG. 3B, the largest value and the second largest value corresponding to the consecutive resource block set RB123 are, for example, 4 and 1. Therefore, for the consecutive resource block set RB123, the absolute difference value between the largest value and the second largest value found by the processing unit 112 is, for example, 3. Taking the consecutive resource block set RB234 as an example, the largest value and the second largest value are, for example, 2 and 1. Therefore, for the consecutive resource block set RB234, the absolute difference value between the largest value and the second largest value found by the processing unit 112 is, for example, 1. Further, taking the consecutive resource block set RB345 as another example, the largest value and the second largest value are, for example, 2 and 1. Therefore, for the consecutive resource block set RB345, the absolute difference value between the largest value and the second largest value found by the processing unit 112 is, for example, 1. In this embodiment, a relationship between the absolute difference values, the consecutive resource block sets, and the user equipment combination may be exemplarily shown in FIG. 3C.

FIG. 3C is a table showing a relationship between the absolute difference values, the consecutive resource block sets, and the user equipment combination according to the embodiment of FIG. 3B. A user equipment combination UE12 is, for example, a combination of the user equipment UE1 and UE2. As described in the above embodiments, the absolute difference values of the user equipment combination UE12 corresponding to the consecutive resource block sets RB123, RB234, RB345 are, for example, 3, 1, and 1.

In step S260, the processing unit 112 may find a maximum absolute difference value among the absolute difference values corresponding to each of the consecutive resource block sets. Take FIG. 3C as an example, the maximum absolute difference value is, for example, 3 (i.e., the absolute difference value corresponding to the consecutive resource block set RB123). Next, in step S270, the processing unit 112 may allocate the consecutive resource block set corresponding to the maximum absolute difference value to the specific user equipment. The specific user equipment is, for example, the user equipment corresponding to the largest value among the consecutive resource block sets being allocated.

Referring to FIG. 3C, the processing unit 112 allocates the consecutive resource block set RB123 corresponding to the maximum absolute difference value (i.e. 3) to the specific user equipment. Referring to FIG. 3B again, since the user equipment corresponding to the largest value (i.e. 4) among the consecutive resource block set RB123 is the user equipment UE2, the processing unit 112 would allocate the consecutive resource block set RB123 to the user equipment UE2 (i.e. the specific user equipment). In addition, the user equipment UE2 (i.e., the specific user equipment) performs transmission with the corresponding minimum transmission rate (i.e. 4) in the consecutive resource block set being allocated RB123. In other words, the user equipment UE2 transmits data on the consecutive resource block set RB123 based on the MCS corresponding to the minimum transmission rate (i.e., 4).

Roughly speaking, the base station and the resource allocation method thereof, disclosed in the embodiment of this disclosure, are configured to simultaneously consider various situations of allocating consecutive resource block sets, selected according to the predetermined window size, to different user equipment before allocating the resource blocks to the user equipment, so as to find the combination (i.e., combination of the user equipment and the consecutive resource block set) that achieves the maximum transmission rate among the possible allocations. Moreover, for the method disclosed in the embodiment of this disclosure, the limitations of "consecutive resource block allocation" and "fixed MCS format" are taken into account simultaneously. Therefore, the method of the embodiment of this disclosure is applicable to the LTE system that uses SC-FDMA as the uplink transmission technology to maximize the overall uplink transmission rate of the LTE system. From another aspect, the method disclosed in the embodiments of this disclosure simultaneously takes all the combinations of the user equipment and consecutive resource block sets into consideration, so as to maximize the overall uplink transmission rate, and thus differs from the conventional method that only considers one user equipment each time.

In other embodiments, the processing unit 112 may repeatedly perform steps S220~S270 until all allocatable resource blocks are allocated. Before all the allocatable resource blocks are allocated, the processing unit 112 may utilize a fixed predetermined window size to continue selecting consecutive resource block sets from the resource blocks being unallocated. Specifically, after performing steps S210~S270, the processing unit 112 may perform again steps S220~S270 to continue finding consecutive resource block sets from the resource blocks being unallocated according to the predetermined window size. According to the above embodiment, the consecutive resource block set RB123 (i.e., resource blocks RB1~RB3) has been allocated to the user equipment UE2. Therefore, the processing unit 112 may find the consecutive resource block set RB45 from the resource blocks RB4~RB5 according to the predetermined window size (e.g., three resource blocks).

For convenience of description, while referring to FIG. 1 and FIG. 2, details of this disclosure are described below also based on the data in FIG. 4A to FIG. 4C. FIG. 4A is a table showing transmission rates of user equipment on resource blocks being unallocated according to the embodiment of FIG. 3A. FIG. 4A may be deemed as a table that only resource blocks being unallocated (i.e., resource blocks RB4~RB5) and the corresponding transmission rates are taken in consideration.

In step S230, the processing unit 112 may find minimum transmission rates of the user equipment among the transmission rates respectively corresponding to the consecutive resource block set RB45. Take FIG. 4A as an example, the processing unit 112 finds that the minimum transmission rate of the user equipment UE1 corresponding to the consecutive resource block set RB45 is 5 bits/RB, and the minimum transmission rate of the user equipment UE2 corresponding to the consecutive resource block set RB45 is 1 bits/RB. In this embodiment, the minimum transmission rates found by the processing unit 112 are organized as the table shown in FIG. 4B. FIG. 4B is the table showing the minimum transmission rates of the user equipment on the consecutive resource block sets according to the embodiment of FIG. 4A.

Then, in step S240, the processing unit 112 may find the largest value and the second largest value corresponding to each of the consecutive resource block sets among the minimum transmission rates corresponding to each of the user equipment. Thereafter, in step S250, the processing unit 112 may calculate the absolute difference value between the largest value and the second largest value corresponding to each of the consecutive resource block sets. In the embodiment of FIG. 4B, the largest value and the second largest value corresponding to the consecutive resource block set RB45 are, for example, 5 and 1. Therefore, for the consecutive resource block set RB45, the absolute difference value between the largest value and the second largest value found by the processing unit 112 is, for example, 4. In this embodiment, the relationship between the absolute difference values, the consecutive resource block sets, and the user equipment combination may be exemplarily shown in FIG. 4C.

FIG. 4C is a table showing a relationship between the absolute difference values, the consecutive resource block sets, and the user equipment combination according to the embodiment of FIG. 4B. The user equipment combination UE12 is, for example, the combination of the user equipment UE1 and UE2. As described in the above embodiment, the absolute difference value of the user equipment combination UE12 corresponding to the consecutive resource block set RB45 is, for example, 4.

In step S260, the processing unit may 112 find the maximum absolute difference value among the absolute difference values corresponding to each of the consecutive resource block sets. Taking FIG. 4C as an example, the maximum absolute difference value is, for example, 4 (i.e., the absolute difference value corresponding to the consecutive resource block set RB45). Next, in step S270, the processing unit 112 may allocate the consecutive resource block set corresponding to the maximum absolute difference value to the specific user equipment. The specific user equipment is, for example, the user equipment corresponding to the largest value among the consecutive resource block sets being allocated.

Referring to FIG. 4C, the processing unit 112 may allocate the consecutive resource block set RB45 corresponding to the maximum absolute difference value (i.e., 4) to the specific user equipment. Referring to FIG. 4B again, since the user equipment corresponding to the largest value (i.e., 5) in the consecutive resource block set being allocated RB45 is the user equipment UE1, the processing unit 112 may allocate the consecutive resource block set RB45 to the user equipment UE1 (i.e., the specific user equipment). In addition, the user equipment UE1 (i.e., the specific user equipment) performs transmission at the corresponding minimum transmission rate (i.e., 5) in the consecutive resource block set being allocated RB45. In other words, the user equipment UE1 would transmit data on the consecutive resource block set RB45 based on the MCS corresponding to the minimum transmission rate (i.e., 5).

Those having ordinary skills in the art should understand that the values (e.g., transmission rates) and the numbers (e.g., the number of the user equipment and the number of the resource blocks) used in each embodiment of the disclosure are merely examples and are not intended to limit how the disclosure is implemented. In other embodiments, after completely allocating the allocatable resource blocks, the processing unit 112 may adjust the predetermined window size and select consecutive resource block sets from resource blocks being unallocated according to the adjusted predetermined window size when performing the next resource block allocation. However, this disclosure is not limited thereto.

Moreover, in another embodiment, the processing unit 112 may further determine whether idle user equipment that does not intend to transmit data exists among the user equipment before performing step S210. If the idle user equipment exists, the processing unit 112 may exclude the idle user equipment from the user equipment and proceed to perform step S210; if not, the processing unit 112 may proceed to perform step S210. Accordingly, when allocating the resource blocks, the processing unit 112 may avoid allocating unnecessary resource blocks to the user equipment that does not have data to be transmitted, and only considers the user equipment that really requires the resource blocks for data transmission, thereby improving the efficiency in utilization of the resource blocks.

To sum up, the base station and the resource allocation method thereof, disclosed in the embodiments of this disclosure, are configured to simultaneously consider various situations of allocating consecutive resource block sets, selected according to the predetermined window size, to different user equipment before allocating the resource blocks to the user equipment, so as to find the combination (i.e., combination of the user equipment and the consecutive resource block set) that achieves the maximum transmission rate among the possible allocations. From another aspect, the base station and the resource allocation method disclosed in the embodiments of this disclosure simultaneously take all the combinations of the user equipment and consecutive resource block sets into consideration, so as to maximize the overall uplink transmission rate, and thus differ from the conventional technology that only considers one user equipment each time. In addition, for the base station provided by this disclosure, before allocating resource blocks to the user equipment, whether the user equipment has any data to be transmitted is also taken into consideration, so as to avoid allocating the resource blocks to the idle user equipment that has no data to be transmitted.

It will be apparent to those skilled in the art that various modifications and variations can be made to the disclosed embodiments without departing from the scope or spirit of this disclosure. In view of the foregoing, it is intended that the disclosure covers modifications and variations provided that they fall within the scope of the following claims and their equivalents.

What is claimed is:

1. A resource allocation method, adapted for a base station allocating a plurality of resource blocks to a plurality of user equipment, the resource allocation method comprising:

calculating a plurality of transmission rates of the plurality of user equipment on the resource blocks that are not allocated to the plurality of user equipment yet;

finding a plurality of consecutive resource block sets among the resource blocks being unallocated according to a predetermined window size, wherein two adjacent consecutive resource block sets of the plurality of consecutive resource block sets comprise at least one identical resource block;

finding a minimum transmission rate of each user equipment among the transmission rates for each user equipment for each of the consecutive resource block sets;

finding a largest value and a second largest value corresponding to each of the consecutive resource block sets among the minimum transmission rate corresponding to each user equipment;

calculating an absolute difference value between the largest value and the second largest value corresponding to each of the consecutive resource block sets, and finding a maximum absolute difference value from the absolute difference value corresponding to each consecutive resource block set; and allocating the consecutive resource block set corresponding to the maximum absolute difference value to one specific user equipment, wherein the specific user equipment is the user equipment corresponding to the largest value of the consecutive resource block set being allocated, and the specific user equipment performs transmission at the corresponding minimum transmission rate in the consecutive resource block set being allocated.

2. The resource allocation method according to claim 1, wherein, after the step of allocating the consecutive resource block set corresponding to the maximum absolute difference value to the specific user equipment, the resource allocation method further comprises:

repeatedly performing the steps from the step of finding the consecutive resource block sets among the resource blocks being unallocated according to the predetermined window size to the step of allocating the consecutive resource block set corresponding to the maximum absolute difference value to the specific user equipment until the resource blocks are completely allocated.

3. The resource allocation method according to claim 2, wherein the predetermined window size is fixed before the resource blocks are completely allocated.

4. The resource allocation method according to claim 2, further comprising adjusting the predetermined window size after the resource blocks are completely allocated.

5. The resource allocation method according to claim 1, wherein, before the step of calculating the transmission rates of the plurality of user equipment on the resource blocks being unallocated, the resource allocation method further comprises:

determining whether an idle user equipment that does not intend to transmit data exists among the plurality of user equipment;
if the idle user equipment exists, excluding the idle user equipment from the plurality of user equipment, and the step of calculating the transmission rates of the plurality of user equipment on the resource blocks being unallocated is performed; and
if no idle user equipment exists, the step of calculating the transmission rates of the plurality of user equipment on the resource blocks being unallocated is performed.

6. The resource allocation method according to claim 1, wherein each of the consecutive resource block sets comprises a plurality of consecutive resource blocks of the resource blocks.

7. A base station, comprising:

a storage unit storing a plurality of codes; and
a processing unit coupled to the storage unit and accessing and executing the codes to perform the following steps:
calculating a plurality of transmission rates of a plurality of user equipment on a plurality of resource blocks that are not allocated to the plurality of user equipment yet;
finding a plurality of consecutive resource block sets among the resource blocks being unallocated according to a predetermined window size, wherein two adjacent consecutive resource block sets of the plurality of consecutive resource block sets comprise at least one identical resource block;
finding a minimum transmission rate of each user equipment among the transmission rates for each user equipment for each of the consecutive resource block sets;
finding a largest value and a second largest value corresponding to each of the consecutive resource block sets among the minimum transmission rate corresponding to each user equipment;
calculating an absolute difference value between the largest value and the second largest value corresponding to each of the consecutive resource block sets, and finding a maximum absolute difference value from the absolute difference value corresponding to each of the consecutive resource block sets; and
allocating the consecutive resource block set corresponding to the maximum absolute difference value to one specific user equipment, wherein the specific user equipment is the user equipment corresponding to the largest value of the consecutive resource block set being allocated, and the specific user equipment performs transmission at the corresponding minimum transmission rate in the consecutive resource block set being allocated.

8. The base station according to claim 7, wherein the processing unit repeatedly performs the steps from the step of finding the consecutive resource block sets among the resource blocks being unallocated according to the predetermined window size to the step of allocating the consecutive resource block set corresponding to the maximum absolute difference value to the specific user equipment until the resource blocks are completely allocated.

9. The base station according to claim 8, wherein the predetermined window size is fixed before the processing unit completely allocates the resource blocks.

10. The base station according to claim 8, wherein the processing unit further adjusts the predetermined window size after the processing unit completely allocates the resource blocks.

11. The base station according to claim 7, wherein the processing unit further determines whether an idle user equipment that does not intend to transmit data exists among the plurality of user equipment;

if the idle user equipment exists, the processing unit excludes the idle user equipment from the plurality of user equipment, and proceeds to perform the step of calculating the transmission rates of the plurality of user equipment on the resource blocks being unallocated; and
if no idle user equipment exists, the processing unit proceeds to perform the step of calculating the transmission rates of the plurality of user equipment on the resource blocks being unallocated.

12. The base station according to claim 7, wherein each of the consecutive resource block sets comprise a plurality of consecutive resource blocks of the resource blocks.

* * * * *